US012252917B2

(12) United States Patent
Dylewski, II et al.

(10) Patent No.: US 12,252,917 B2
(45) Date of Patent: Mar. 18, 2025

(54) VEHICLE DOOR LATCH SECURITY TETHER

(71) Applicant: Leer Group, Elkhart, IN (US)

(72) Inventors: Eugene A. Dylewski, II, Granger, IN (US); Ernest M. McDonald, II, Granger, IN (US)

(73) Assignee: Leer Group, Elkhart, IN (US)

( * ) Notice: Subject to any disclaimer, the term of this patent is extended or adjusted under 35 U.S.C. 154(b) by 0 days.

(21) Appl. No.: 18/319,056

(22) Filed: May 17, 2023

(65) Prior Publication Data

US 2023/0287716 A1 Sep. 14, 2023

Related U.S. Application Data

(63) Continuation of application No. 17/458,793, filed on Aug. 27, 2021, now Pat. No. 11,655,657, which is a continuation of application No. 16/562,656, filed on Sep. 6, 2019, now Pat. No. 11,105,129, which is a continuation of application No. 14/928,003, filed on Oct. 30, 2015, now Pat. No. 10,407,953.

(60) Provisional application No. 62/073,608, filed on Oct. 31, 2014.

(51) Int. Cl.

| | |
|---|---|
| ***E05C 9/08*** | (2006.01) |
| ***E05B 13/00*** | (2006.01) |
| ***E05B 83/22*** | (2014.01) |
| ***E05B 85/10*** | (2014.01) |
| ***E05C 3/04*** | (2006.01) |

(52) U.S. Cl.

CPC ............ *E05C 9/085* (2013.01); *E05B 13/004* (2013.01); *E05B 83/22* (2013.01); *E05B 85/10* (2013.01); *E05C 3/042* (2013.01); *E05C 3/046* (2013.01)

(58) Field of Classification Search

CPC .......... E05C 9/085; E05C 3/042; E05C 3/046; E05B 13/004; E05B 83/22; E05B 85/10

See application file for complete search history.

(56) References Cited

U.S. PATENT DOCUMENTS 4,321,812 A * 3/1982 Pelcin .................... E05C 1/145 292/DIG. 31

4,683,736 A * 8/1987 Weinerman ............... E05B 9/08 248/27.3

(Continued)

*Primary Examiner* — Mark A Williams

(74) *Attorney, Agent, or Firm* — Barnes & Thornburg LLP

(57) ABSTRACT

A vehicle that includes a door, handle, shaft, and a latch assembly is provided. The latch assembly is coupled to the door to selectively secure the door. The latch assembly includes a security tether configured to prevent the shaft from moving the pawl when the lock lever is located in the locked condition. The security tether further includes: a plate attachable to the latch assembly; the plate includes an aperture sized to receive at least a portion of the lock lever that is disposed through the aperture; the plate includes first and second stop surfaces to limit movement of the lock lever; the first and second stop surfaces are also spaced apart from each other; the lock lever is movable between the first and second stop surfaces; at least the first stop surface is spaced apart from the first location on the pawl; and the lock lever engages the first stop surface when the lock lever is located in the locked condition to prevent the pawl from moving to the unlatched condition and unlatching the latching assembly.

18 Claims, 11 Drawing Sheets

(56) References Cited

U.S. PATENT DOCUMENTS

| | | | | | |
|---|---|---|---|---|---|
| 4,838,054 | A * | 6/1989 | Weinerman | E05B 9/08 | 292/DIG. 31 |
| 5,913,908 | A * | 6/1999 | Czipri | E05C 3/042 | 70/210 |
| 5,941,104 | A * | 8/1999 | Sadler | E05B 85/14 | 292/216 |
| 5,987,942 | A * | 11/1999 | Ichinose | E05B 85/18 | 70/451 |
| 6,513,353 | B1 * | 2/2003 | Weinerman | E05C 9/047 | 292/DIG. 31 |
| 6,651,467 | B1 * | 11/2003 | Weinerman | E05B 5/00 | 292/216 |
| 8,579,337 | B2 * | 11/2013 | Hidding | E05B 79/12 | 292/DIG. 31 |
| 11,105,129 | B2 * | 8/2021 | Dylewski, II | E05C 3/042 | |
| 2005/0257582 | A1 * | 11/2005 | Minix | E05B 13/004 | 70/210 |
| 2011/0113838 | A1 * | 5/2011 | Stuckey | E05B 47/0673 | 70/264 |
| 2014/0083147 | A1 * | 3/2014 | Weinerman | E05B 13/004 | 70/357 |

* cited by examiner

VEHICLE DOOR LATCH SECURITY TETHER

RELATED APPLICATIONS

The present Application is a continuation application of Continuation application Ser. No. 17/458,793, filed on Aug. 27, 2021, and Continuation application Ser. No. 16/562,656, filed on Sep. 6, 2019, entitled "Vehicle Door Latch Security Tether" and claims priority to application Ser. No. 14/928,003, filed on Oct. 30, 2015, entitled "Vehicle Door Latch Security Tether" and claims priority to U.S. Provisional Patent Application, Ser. No. 62/073,608 filed on Oct. 31, 2014, entitled "Vehicle Door Latch Security Tether." To the extent not included below, the subject matter disclosed in these applications are hereby expressly incorporated into the present Application.

BACKGROUND AND SUMMARY

The present disclosure relates to work truck doors and latches, and in particular to a security tether for a vehicle compartment door latch.

Conventional compartment door truck latches include a pivoting handle acting as a lever where moving it in one direction latches the door and moving in the opposite direction unlatches the door. The handle is attached to a latch shaft that is attached to a pawl that selectively engages or disengages a lock lever to lock or unlock the latch. Under normal circumstances, however, securement between the pawl and the lock lever is often not enough to prevent a forced engagement on the handle from unlatching the door. The combined resistance from the arm and latch is not, on its own, strong enough to withstand extreme forces and prevent failure. This obviously limits the effectiveness of this latching mechanism.

An illustrative embodiment of the present disclosure provides a security tether which engages a portion of the pivot shaft attached to the handle and latch mechanism so that a force applied to the handle is absorbed by the tether to prevent the locking function from failing. In an embodiment, the security tether withstands a typical forced engagement applied by a human arm. If a tool is used to pry the handle and shaft, the security tether may cause a failure different from the prior art and instead the handle and shaft strip-out. The security tether, however, keeps the panel and, thus, the latch in place. This means that a forced incursion using tools on the handle will now only cause the handle to break but not unlatch the door. Such an intentional failure mechanism creates an additional level of security.

Another illustrative embodiment of the present disclosure provides a vehicle that includes a door, handle, shaft, and a latch assembly. The latch assembly is coupled to the door to selectively secure the door. Further, the latch assembly includes: the handle being coupled to the shaft and configured to rotate the shaft about the shaft's longitudinal extent; a pawl is attached to the shaft and configured to move between latched and unlatched conditions when the shaft is rotated; a lock lever is movable between locked and unlocked conditions; when the lock lever is located in the locked condition, the lock lever engages the pawl at a first location so the pawl is prevented from moving to the unlatched condition; when in the unlocked condition, the lock lever is disengaged from the first location so the pawl is not prevented from moving to the unlatched condition; and a security tether configured to prevent the shaft from moving the pawl, when the lock lever is located in the locked condition. The security tether further includes: a plate attachable to the latch assembly; the plate includes an aperture sized to receive at least a portion of the lock lever that is disposed through the aperture; the plate includes first and second stop surfaces that limit movement of the lock lever; the first and second stop surfaces are also spaced apart from each other; the lock lever is movable between the first and second stop surfaces; at least the first stop surface is spaced apart from the first location on the pawl; and the lock lever engages the first stop surface when the lock lever is located in the locked condition to prevent the pawl from moving to the unlatched condition and unlatching the latch assembly.

In the above and other embodiments, the vehicle may further include: the lock lever engaging the first location on the pawl and the first stop surface to prevent the pawl from moving to the unlatched condition and unlatching the latch assembly; the first and second stop surfaces being non-parallel to a periphery surface of the aperture in the plate; the plate being attachable to the pin on the lock assembly; the plate does not move with respect to the pin or the lock lever; and the lock lever is movable by a lock cylinder that moves the lock lever about an axis.

Another illustrative embodiment of the present disclosure includes a vehicle that includes a door and a latch assembly. The latch assembly is coupled to the door to selectively secure the door. A first portion of the latch assembly is located on a first surface of the door and a second portion of the latch assembly is located on a second surface of the door. The first and second surfaces of the door are opposing sides of each other. The latch assembly also includes: a shaft disposed through the first and second surfaces of the door; the shaft being configured to rotate about its longitudinal extent; a pawl attached to the shaft and configured to move between latched and unlatched conditions when the shaft is rotated; a lock lever spaced apart from the latch assembly and movable between locked and unlocked conditions; when the lock lever is located in the locked condition the lock lever engages the pawl at a first location so the pawl is prevented from moving to the unlatched condition, and when in the unlocked condition, the lock lever is disengaged from the first location so the pawl is not prevented from moving to the unlatched condition; and a security tether configured to prevent the shaft from moving the pawl when the lock lever is located in the locked condition. The security tether includes: a plate attachable to the latch assembly; the plate includes an aperture sized to receive at least a portion of the lock lever that is disposed through the aperture; the plate further includes first and second stop surfaces to limit movement of the lock lever; the first and second stop surfaces are spaced apart from each other; the lock lever is movable between the first and second stop surfaces; at least the first stop surface is spaced apart from the first location on the pawl; and the lock lever engages the first stop surface when the lock lever is located in the locked condition to prevent the pawl from moving to the unlatched condition and unlatching the latch assembly.

In the above and other embodiments, the vehicle may further include: the lock lever engaging the first location on the pawl and the first stop surface to prevent the pawl from moving to the unlatched condition and unlatching the latch assembly; the first and second stop surfaces being non-parallel to a periphery surface of the aperture in the plate; the plate does not move with respect to the pin or the lock lever; the lock lever being movable by a lock cylinder that moves the lock lever about an axis; and at least a portion of the lock cylinder being disposed through the aperture.

Another illustrative embodiment of the present disclosure provides a vehicle that includes a door and a security tether. The security tether is configured to attach to a latch assembly on the door to prevent the latch assembly from being moved to an unlatched condition. The security tether includes a plate configured to attach to the latch assembly; the plate includes a hole disposed through the plate of a first diameter that is sized to receive at least a portion of a lock assembly that is disposed through the hole; the plate further including a channel formed at a periphery of the hole to create a portion of the hole to have a second diameter; the first diameter being less than the second diameter; the channel terminates at one end by a first stop and terminates at a second end by a second stop; and the first and second stops are spaced apart from each other and are configured to limit movement of the lock assembly.

Another illustrative embodiment of the present disclosure provides a vehicle that includes a door and a security tether. The security tether is configured to attach to a latch assembly to prevent a latch assembly on the door from being moved to an unlatched condition. The security tether further includes a plate configured to attach to the latch assembly; the plate includes a hole disposed through the plate that is sized to receive at least a portion of a lock assembly that is disposed through the hole; a portion of the hole extends to the periphery of the plate forming an opening transverse to the longitudinal extent of the hole; the opening terminates at one end by a first stop and terminates at a second end by a second stop; and the first and second stops are spaced apart from each other and are also configured to limit movement of the lock assembly.

Additional features of the present disclosure will become apparent to those skilled in the art upon consideration of illustrative embodiments including the best mode of carrying out the disclosure as presently perceived.

BRIEF DESCRIPTION OF THE DRAWINGS

The present disclosure will be described hereafter with reference to the attached drawings which are given as non-limiting examples only, in which.

DETAILED DESCRIPTION

Figure 1:
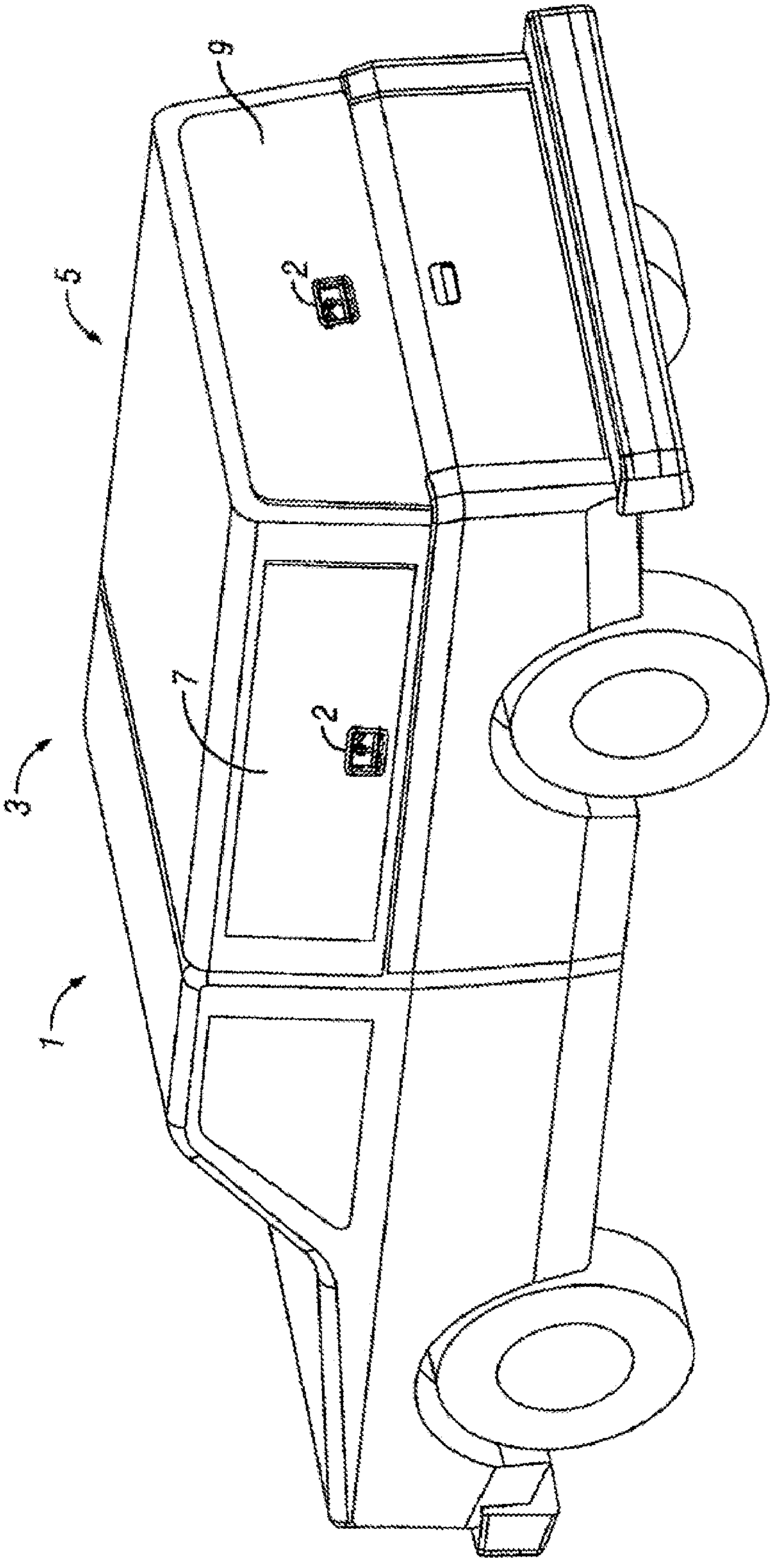
FIG. 1 is a rear perspective view of a vehicle with a door incorporating a latch assembly of the type that is subject of the present disclosure.

A rear perspective view of an illustrative embodiment of a vehicle, such as pickup truck 1, is shown in FIG. 1. This view depicts truck 1 having a passenger compartment 3 and a cap 5 covering the truck's rear bed. Cap 5 also includes illustrative doors 7 and 9 which swing open to allow access to the interior of the rear bed. Vehicle door latch assembly 2 is shown on door 7 and 9 to secure and lock said doors to vehicle 1. Actuating latch 2 releases the door to allow it to swing or otherwise move to the open condition. When latch 2 is latched and locked, the door is prevented from opening unless force can be applied to the latch and/or lock to overcome the locking function of the lock.

Figure 2:
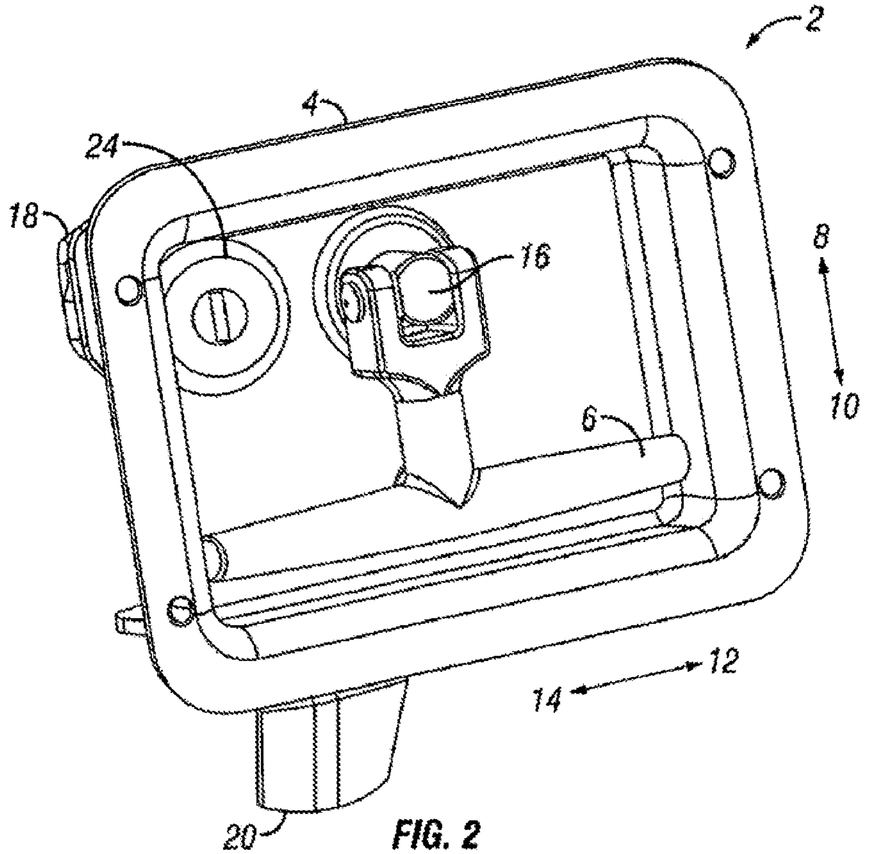
FIG. 2 is a front perspective view of a vehicle door latch.

A front perspective view of vehicle door latch assembly 2 is shown in FIG. 2. These latches are commonly used on compartment doors for commercial and industrial vehicles, such as lifts and work trucks, to secure the compartment door or the like. Typically these latches, from the operator's point of view, include a main housing 4 with a pivotable handle 6 that is both recessible in and extendible from housing 4. During operation, handle 6 is pivoted upward in direction 8. Handle 6 is attached to shaft 16 so both are rotatable in the same direction 12. This causes pawl 18 with latch tab 20 attached thereto to rotate in direction 12 and unlatch the door (not shown). Conversely, to relatch the door, handle 6 is turned in direction 14 which likewise turns shaft 16 which rotates pawl 18 and latch tab 20 in direction 14. Tab 20 reengages a securement (not shown) on the periphery of the compartment opening to latch the door (also not shown) closed. With the door latched, handle 6 may be pushed downward in direction 10 into cavity 22 of housing 4 so as not to become an obstruction while operating the vehicle. To lock latch assembly 2, a lock cylinder assembly 24 extends through housing 4 and is engageable with a key (not shown) which rotates between lock and unlock conditions. The problem with this design is that the rotational force that can be applied to shaft 16 from handle 6 may be stronger than what the structure associated with lock cylinder assembly 24 can withstand. This makes the locking system vulnerable.

An embodiment of the present disclosure herein includes a tether structure 30 (see FIG. 3) that provides the needed strength so that excessive force on shaft 16 will not be able to overcome the locking and latching features. It is contemplated that security tether 30 is able to be added to latch assembly 2 as an add-on. This makes the fix both relatively simple and affordable in contrast to purchasing complete new latch assemblies.

Figure 3:
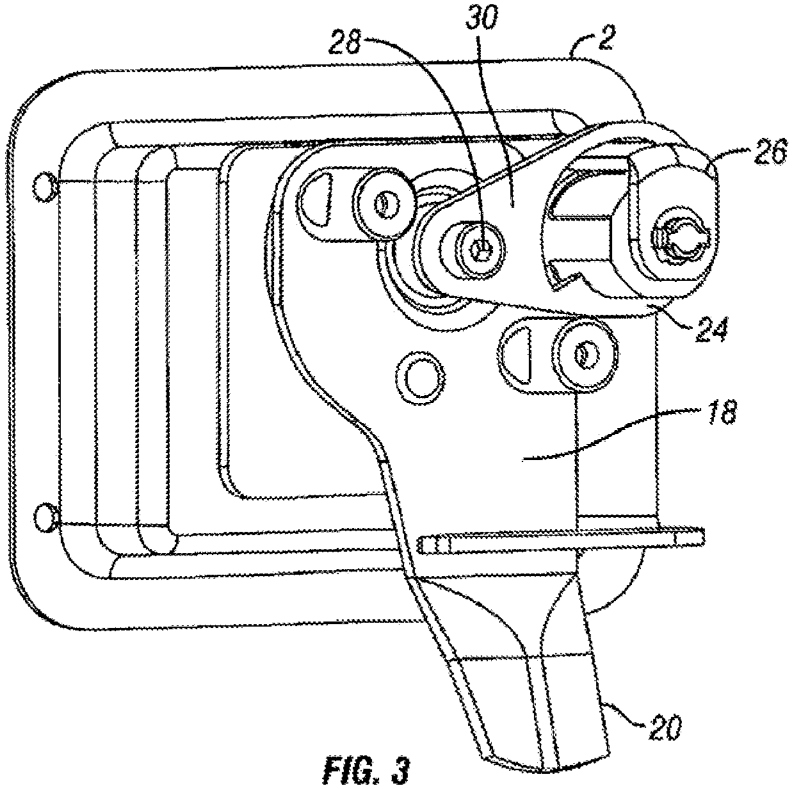
FIG. 3 is a rear perspective view of a vehicle door latch with a security tether attached.

A rear perspective view of vehicle door latch assembly 2 is shown in FIG. 3. This view further shows pawl 18, latch tab 20, and lock cylinder assembly 24. Also shown is lock lever 26 located in unlocked and latched conditions. It is appreciated that the key that turns a portion of lock cylinder 24 rotates lock lever 26 between locked and unlocked conditions. The locked condition is configured (as further disclosed herein) to lock pawl 18 keeping it from moving. This view also shows the head portion of bolt 28 which is attached to the aforementioned shaft 16 to provide the pivot point for pawl 18.

What is new to latch assembly 2 is the addition of security tether 30 with bolt 28 and spacer 90. This tether couples to both shaft 16 and lock lever 26 about lock cylinder assembly 24 to prevent excessive rotational force on shaft 16 from breaking lock cylinder 24, thereby lock lever 26 unlocking and unlatching latch assembly 2.

Figure 4:
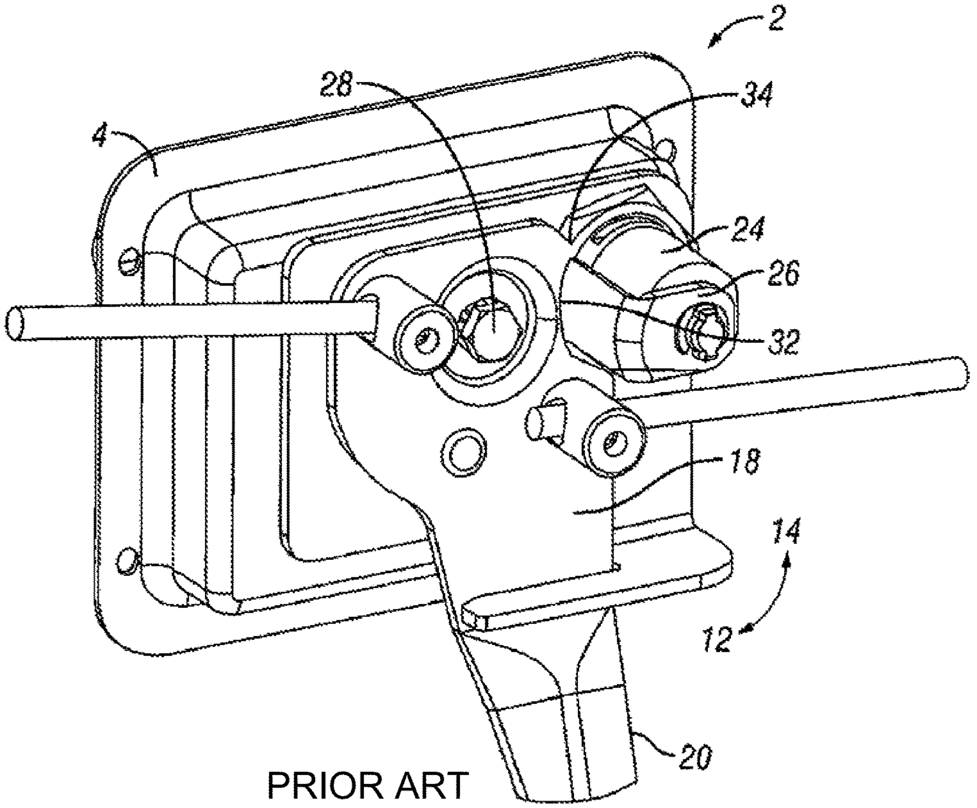
PRIOR ART FIG. 4
FIG. 4 is another prior art view of the prior art latch shown in locked and latched conditions.
Figure 5:
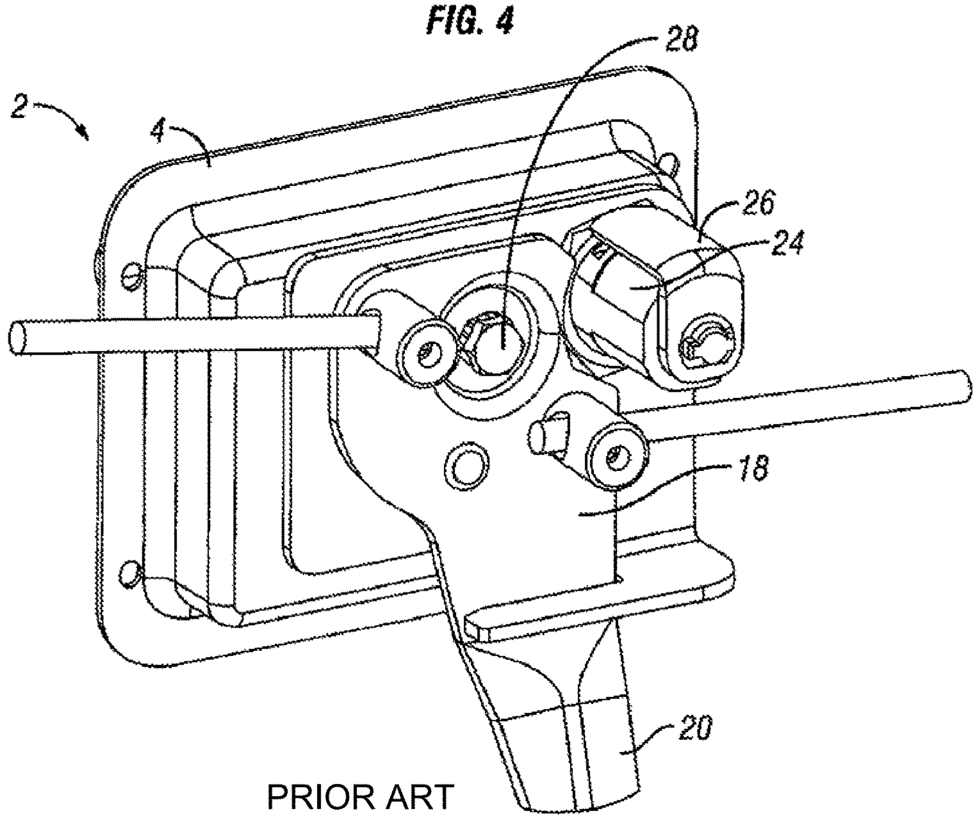
PRIOR ART FIG. 5
FIG. 5 is a rear perspective view of the prior art version of the latch assembly in a latched but unlocked condition.
Figure 6:
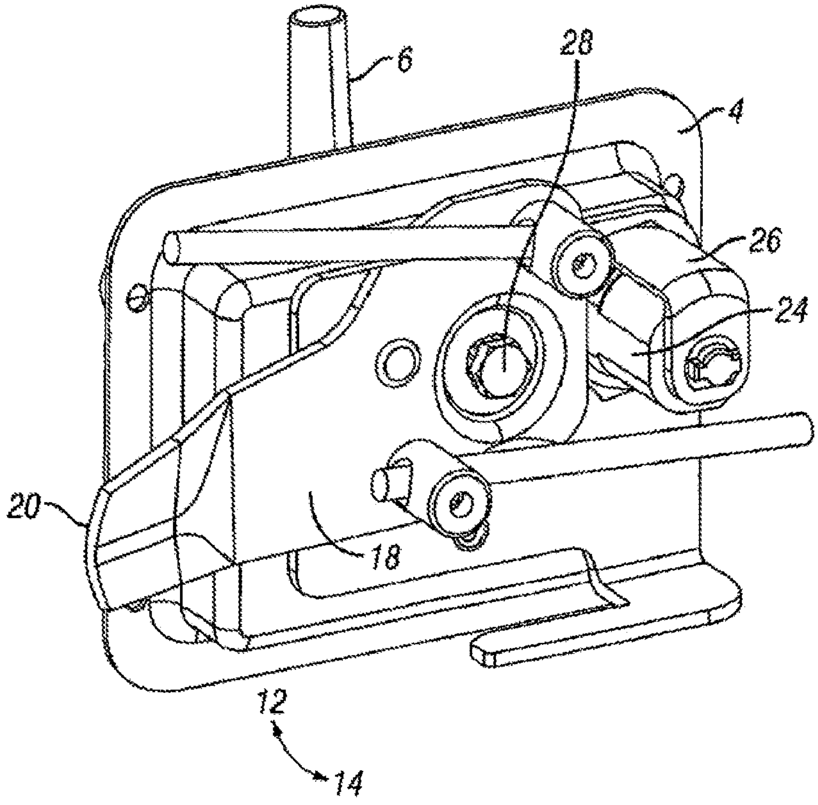
FIG. 6 PRIOR ART
FIG. 6 is another rear perspective view of the prior art version of the latch assembly shown in both unlatched and unlocked conditions.

A rear perspective view of a prior art version of latch assembly 2 is shown in FIGS. 4 through 6. These views do not include security tether 30. As shown in FIG. 4, pawl 18 locates latch tab 20 in the latched condition. Additionally, lock cylinder assembly 24 has pivoted lock lever 26 in a locked condition. In this state, lock lever 26 is positioned in cavity 32 formed in pawl 18. Cavity wall portion 34 is configured to engage lock lever 26 such that if an attempt is made to rotate pawl 18 in direction 12, lock lever 26 engages cavity wall portion 34 preventing that movement from happening. As can be appreciated, however, overcoming that engagement between lock lever 26 and cavity wall portion 34 is all that is needed to overcome the locking function. It is further appreciated that pawl 18 is formed out of a piece of relatively thin metal so the force needed to overcome that engagement is not all that great. The prior art view in FIG. 5 shows lock lever 26 in the unlocked condition. Pawl 18 and tab 20 are still located in the latched condition, but they are free to rotate if shaft 16 is rotated. The prior art view in FIG. 6 shows handle 6 rotated, which rotates shaft 16 and pivots pawl 18 and tab 20 in direction 12 to an unlatched condition. It is appreciated from this view that tab 20 simply needs to be moved to this position to unlatch the door. Overcoming lock lever 26 is all that is needed to unlatch assembly 2 without a key.

Figure 7:
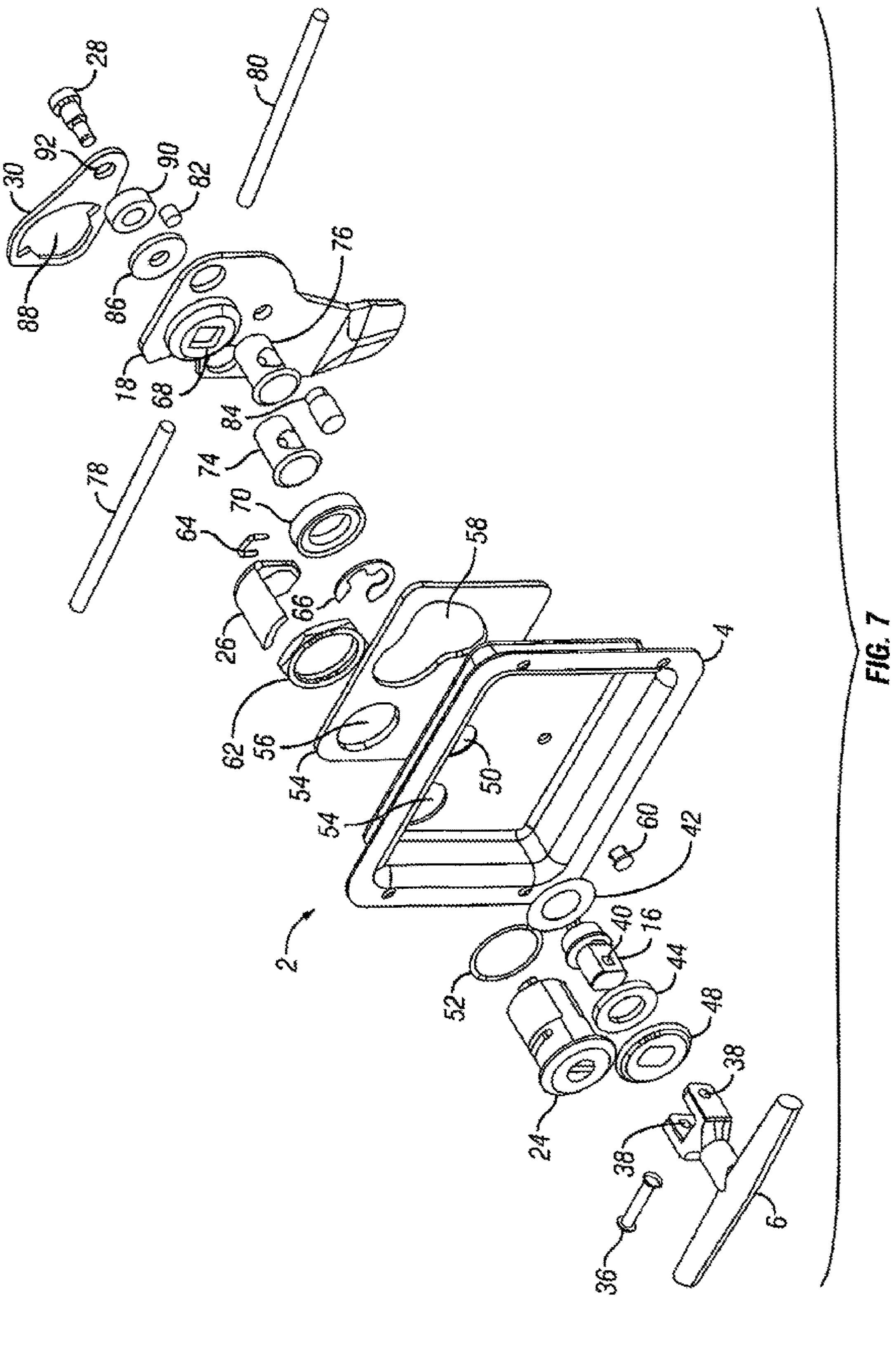
FIG. 7 is an exploded view of the door latch assembly including a security tether for same.

An exploded view of vehicle door latch assembly 2 that includes security tether 30 is shown in FIG. 7. As depicted, handle 6 is pivotally coupled to shaft 16 via handle rivet 36 disposed through coincident openings 38 and 40. To seal shaft 16 from exterior to interior, shaft gasket 42, along with shaft cover gasket 44 and shaft cover 48, surround shaft 16. Housing 4 includes a bore opening 50 that receives shaft 16 so it can be located on both the front and rear side of latch 2. Also shown is lock cylinder assembly 24 that extends through cylinder gasket 52 and bore 54 in housing 4 to extend between front and rear sides of housing 4. A flange 54 includes openings 56 and 58 and is secured onto housing 4 via rivet 60. A hex nut 62 secures lock cylinder assembly 24 to housing 4 and lock lever 26 secures to lock cylinder 24 via e-ring 64. Shaft 16 also extends through opening 58 of flange 54 and secures to latch 2 via shaft e-ring 66 and bolt 28. Pawl 18 pivotally secures to latch assembly 2 via shaft 16 that extends through opening 68. A washer 70 may be disposed about shaft 16 between pawl 18 and flange 54 to assist in pivotal movement of same. Rod posts 74 and 76 are configured to attach to pawl 18, as well as lock rods 78 and 80. Set screws 82 secure rods 78 and 80 to posts 74 and 76, respectively. A cam rivet 84 is secured to pawl 28 in order to limit pawl 18's movement.

Security tether 30, having openings 88 and 92 disposed therethrough, is coupled to latch assembly 2 via bolt 28. A spacer 90, as well as bolt 28, spaces apart tether 30 from pawl 18 and cam washer 86 (see also FIG. 13).

There are essentially three failure modes for the prior art version of latch assembly 2. The first is where the axes of both shaft 16 and lock cylinder 24 splay themselves apart when pawl 18 is rotated in direction 12. This is caused by wall portion 34 of pawl 18 pushing against lock lever 26 when force is being applied towards direction 12. Another failure mechanism is when a force on pawl 18 is applied in direction 12 causing wall portion 34 of pawl 18 to engage lock lever 26 causing excessive force on retainer 106 and e-ring 64. This torsion force causes both structures to fail which essentially allows lock lever 26 to "pop" off of lock cylinder 24. This allows pawl 18 to be moveable. A third failure mechanism occurs when applying excessive force against pawl 18 in direction 12, causing wall portion 34 of pawl 18 to apply a force against lock lever 26. But instead of retainer 106 failing, the internal locking structures in lock cylinder 24 strip, thereby causing lock lever 26 to be moveable to the unlocked condition and allowing pawl 18 to move and unlatch. The embodiments of the security tether keep the axis of shaft 16 (with bolt 28) and lock cylinder 24 substantially parallel to each other under excessive force preventing the first failure mechanism as described above. In addition, the tethers absorb the force applied to lock lever 26 by wall portion 34 of pawl 18, thereby preventing the failure of lock lever 26 by either the second or third failure mechanisms described above.

Figure 8B:
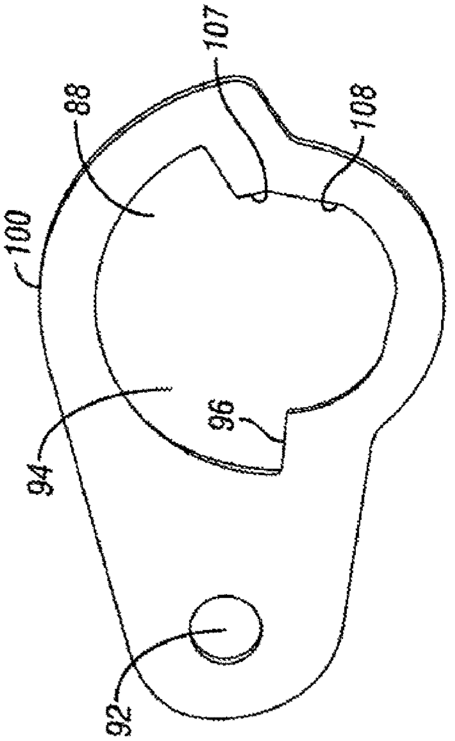
FIGS. 8A, 8B, and 8C are front perspective views and embodiments of security tethers.
Figure 8A:
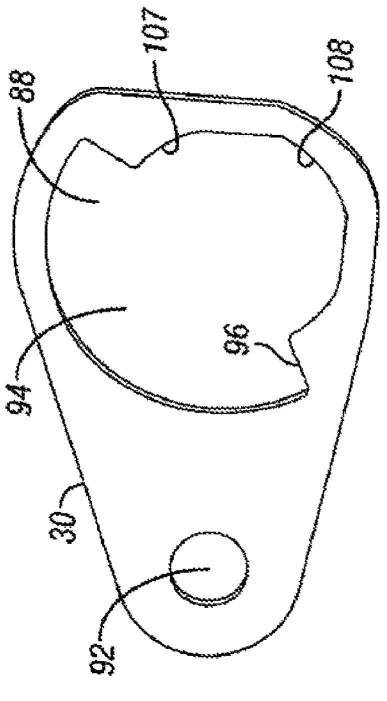
Figure 8C:
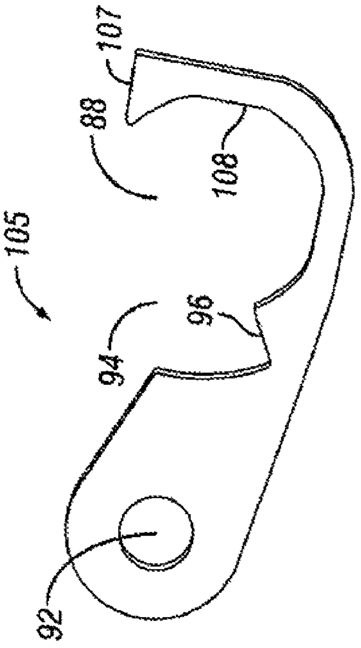

Front perspective views of embodiments of security tethers 30, 100, and 105 are shown in FIGS. 8A, 8B, and 8C respectively. These security tethers may be made of a solid piece of metal, such as steel, aluminum, brass, or other materials, such as high density polyethylene or a laminate. Openings 88 and 92 receive the lock cylinder and shaft, respectively, as previously discussed. As part of opening 88, there is a lever slot portion 94 that receives lock lever 26. Slot portion 94 is configured to accommodate rotational travel of lock lever 26 between locked and unlocked conditions. By providing a strengthened tie between shaft 16 and lock cylinder 24, forced rotation of shaft 16 can no longer overcome lock lever 26. Each of the embodiments 30, 100, and 105 shown in FIG. 8 includes opening 88 and slot portion 94 terminating at edges 96. In addition, along the periphery of opening 88 are wall portions 107 and 108.

Edge 96 on lever slot portion 94 now receives the force of lock lever 26 instead of the force received by retainer 106 and e-ring 64. This means first, there is a strong reinforcement to hold the locked condition, and second, any strong forces applied to edge 96 through shaft 16 will cause a failure at the shaft instead of at the lock, and particularly at the pawl. Accordingly, any failure due to excess force will not occur at the pawl nor the retainer and clip and, thus, not move latch tab 20.

Surface 107 on the embodiments keeps the tether positioned against the lock cylinder 24 (see also FIGS. 4 and 9) so that if an excessive force applied to pawl 18 in direction 12 causes wall portion 34 to act on lock lever 26, edge 96 engages lock lever 26, but that force is offset by engagement of surface 107 against lock cylinder 24. Surface 108 in the embodiments keep shaft 16/bolt 28 and lock cylinder 24 substantially parallel to prevent them from splaying. If any excessive force is applied to handle 6, shaft 16 will only strip-out or break those structures, while latch 2 remains latched.

Security tether 100 is similar to that shown in embodiment 30 except that opening 88 and slot 94 are shifted in order to accommodate a lock cylinder of different configuration. This embodiment shows opening 98 configured to accept a 20 degree lock lever. It is appreciated that the angle of opening 98 may be set to any degree and is not limited to a 20 degree lock lever.

Security tether 105 included in FIG. 8 with tether 30 is another embodiment having an "open" version where part of the material forming slot 94 has been removed. In any event, the wall portions 95, 107, and 108 are still there and serve the same functions as those portions in tethers 30 and 100.

Figure 9:
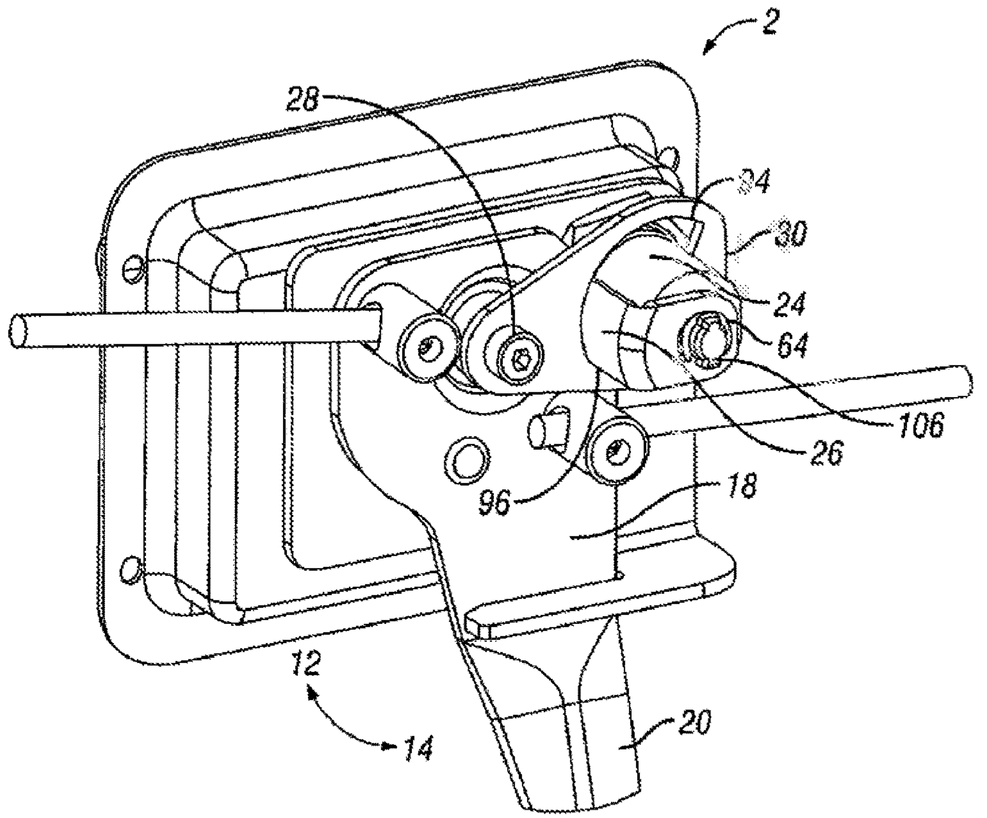
FIG. 9 is a rear perspective view of the latch assembly with a tether attached thereto, wherein the latch assembly is in both latched and locked conditions.
Figure 10:
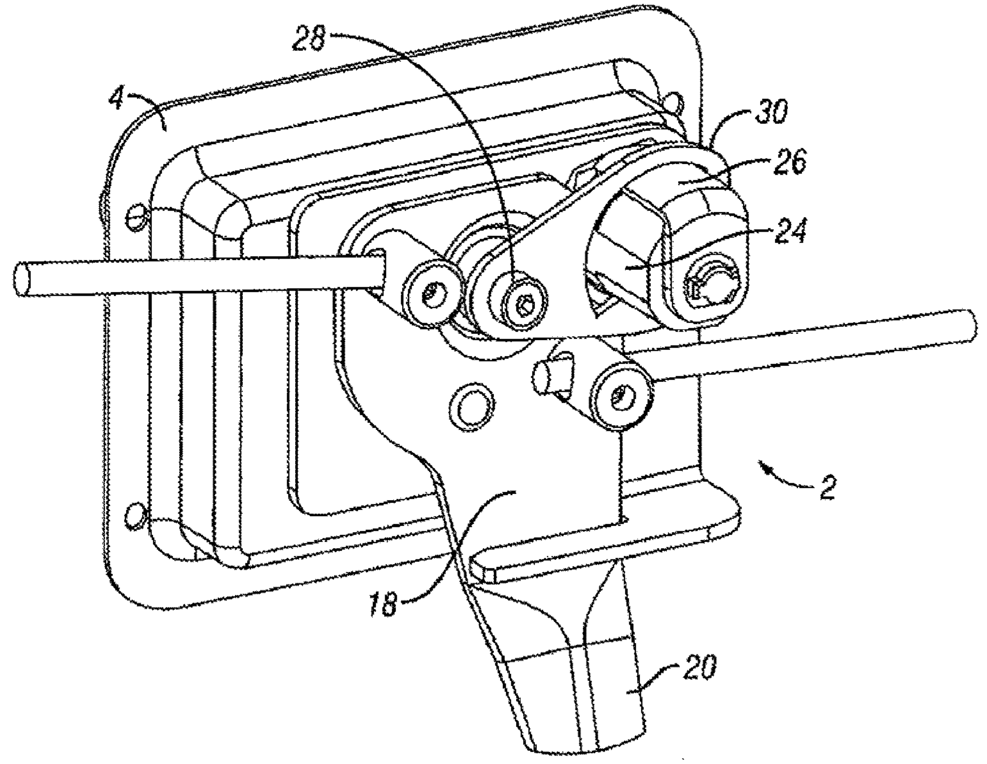
FIG. 10 is another rear perspective view of the latch assembly with a security tether attached thereto, wherein the latch assembly is in a latched but unlocked condition.
Figure 11:
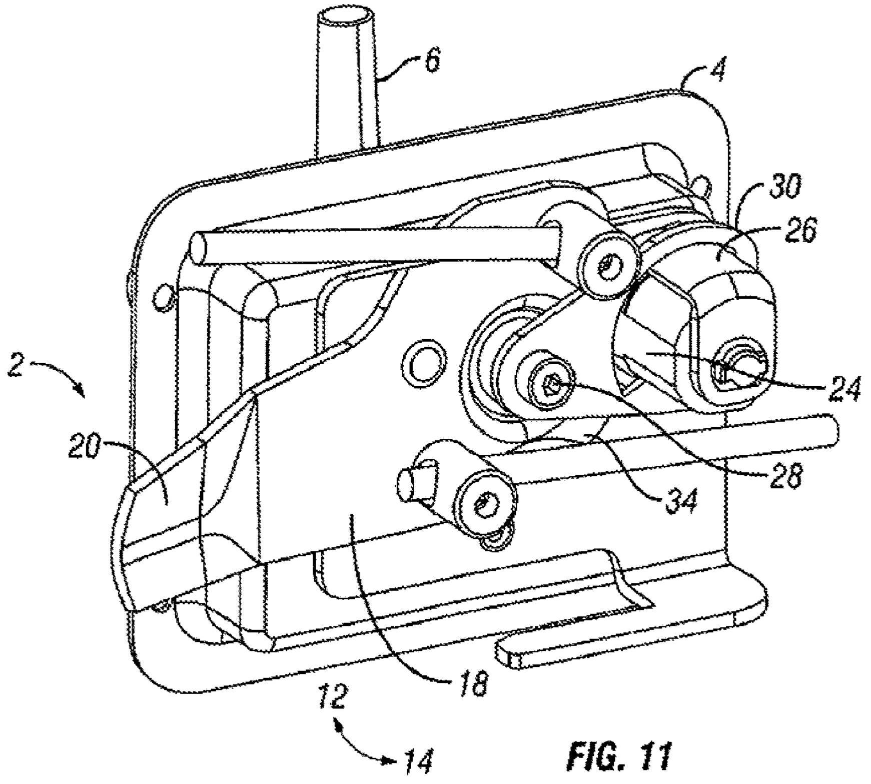
FIG. 11 is another rear perspective view of the latch assembly with a security tether attached thereto, wherein the latch assembly is shown in unlatched and unlocked conditions.

Rear perspective views of assembly 2, as shown in FIGS. 9 through 11, are similar to the prior art views of FIGS. 3 through 5 except with security tether 30 attached to shaft 16 via bolt 28. Also, tether 30 is located about the periphery of lock cylinder 24 with lever slot portion 94 accommodating lock lever 26. As shown in FIG. 9, lock lever 26 is located in the locked condition with pawl 18 and tab 20 located in the latched condition. In this view, it is appreciated that if shaft 16 attempts to rotate pawl 18 in direction 12, lock lever 26 engages edge 96 of tether 30 which will prevent any movement. The views in FIGS. 10 and 11 demonstrate how security tether 30 does not interfere with lock lever 26 as lock cylinder 24 moves it to the unlocked condition (see FIG. 10). Handle 6 rotates pawl 18 in direction 12 to move tab 20 to the unlatched condition. In other words, the operation of latch 2 may progress as normal without any interference from security tether 30. It is only when forced movement of shaft 16 attempts to break open latch 2 does security tether interfere with operation of pawl 18 and lock lever 26.

Figure 12:
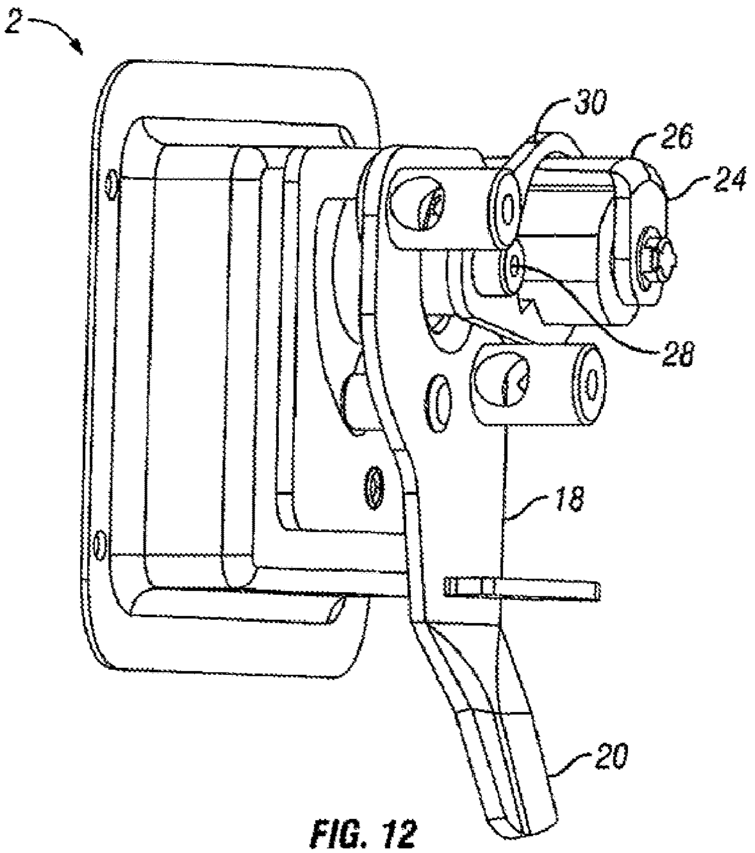
FIG. 12 is a perspective view of the latch assembly with a security tether attached thereto.
Figure 14:
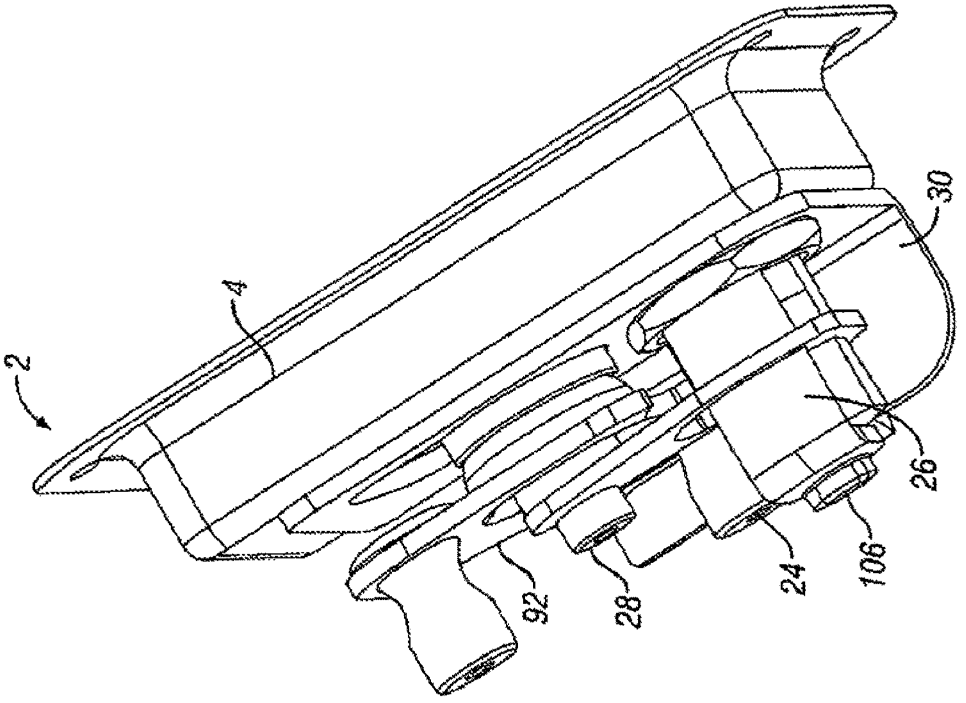
FIG. 14 is a top perspective view of the latch assembly with the security tether attached thereto.
Figure 13:
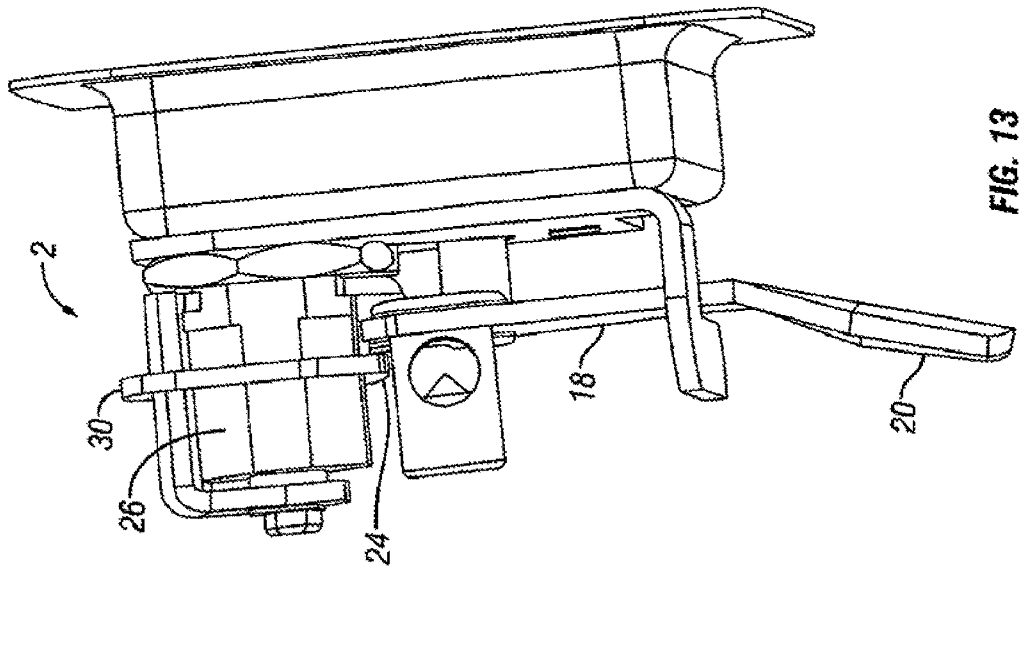
FIG. 13 is a different perspective view of the latch assembly with a security tether attached thereto.

Latch assembly 2, shown in FIGS. 12 through 14, depicts security tether 30 coupled thereto from different angles. It is appreciated from these views that security tether 30 is configured to just slide over lock cylinder 24 and secure onto shaft 16 via bolt 28. Accordingly, retrofitting current similar-type latches is a relatively easy task.

Figure 15B:
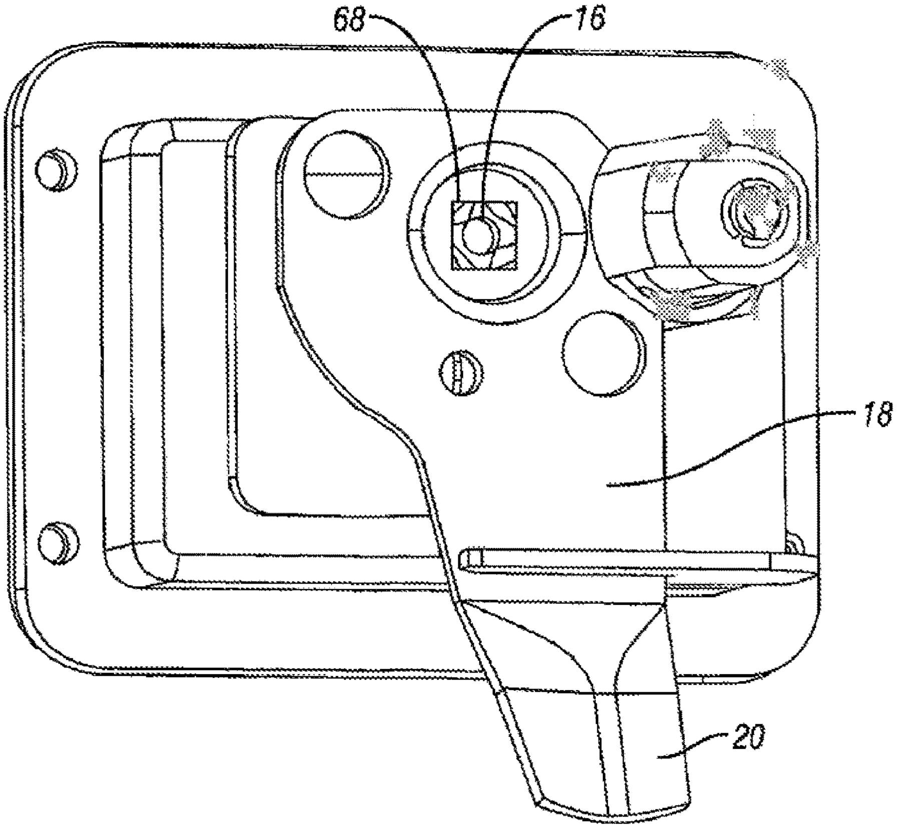
FIGS. 15A, 15B and 15C include perspective and detail views of the latch assembly showing the effects on the latch assembly when excessive force is used when a security tether is and is not used.
Figure 15A:
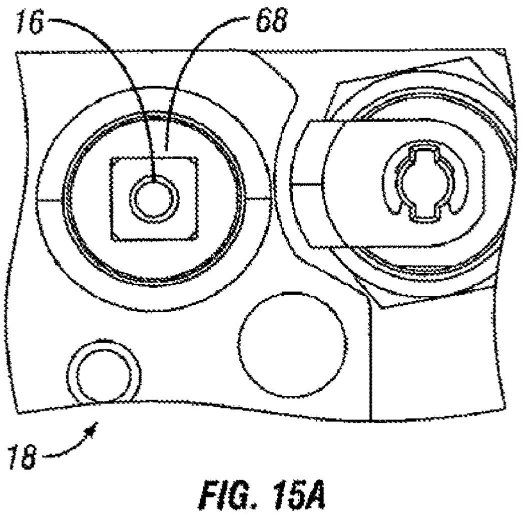
Figure 15C:
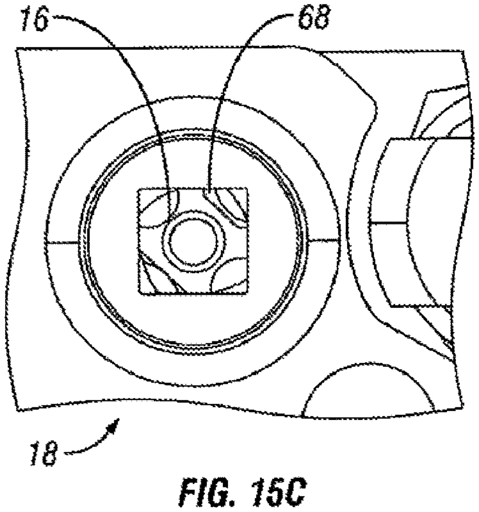

The views shown in FIGS. 15A through 15C demonstrate what happens if excessive force is applied to shaft 16 in order to break latch 2. In FIG. 14A, shaft 16 is located in opening 68 of pawl 18. In this illustrative embodiment, both this portion of shaft 16 and its corresponding opening 68 are square-shaped. It is appreciated that in other embodiments they are not limited to square shape. With security tether 30 in operation, it is shaft 16 that strips out while pawl 18 does not move. The view shown in FIG. 14B depicts the result of applying too much force to shaft 16 with security tether 30 in place. It is appreciated that this view has removed security tether 30 for illustrative purposes to show what happens to shaft 16 and opening 68 as a result of an applied break-in force. A detailed view of shaft 16 and opening 68 in FIG. 14C demonstrates how both structures are stripped out so that shaft 16 can rotate with respect to opening 68 yet not move pawl 18. When this happens, rotation of shaft 16 will fail to rotate latch tab 20 which maintains itself in a latched condition.

Figure 16A:
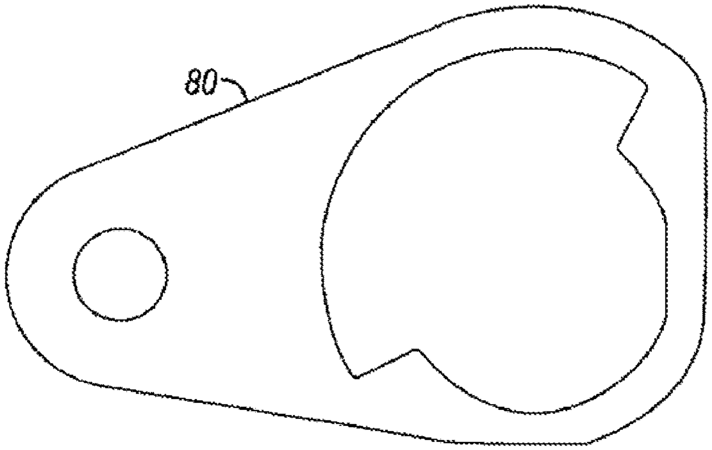
FIGS. 16A and 16B are front and top views of a security tether showing illustrative dimensions thereto for use on illustrative door latches.
Figure 16B:
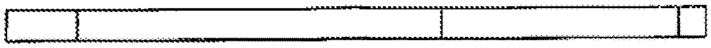

Illustrative dimensions of an embodiment of security tether 30 are shown in FIGS. 16A and 16B. It is appreciated that these dimensions are illustrative. It is further appreciated that the position of the openings may be changed based on the desired configuration of the latch and lock assembly it is attaching to.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

What is claimed is:

1. A security tether for a latch assembly of a truck cap, which covers a rear bed of a pickup truck, wherein the latch assembly includes a pawl that is movable between a latched condition and an unlatched condition, a lock assembly with a lock lever that is engageable with the pawl when the lock assembly is in a locked condition and disengageable from the pawl when the lock assembly is in an unlocked condition, wherein the security tether is configured to provide an additional security feature to the lock lever, the security tether comprising:

a plate configured to be attached to the latch assembly adjacent the lock assembly;

wherein the plate is configured to be non-movable with respect to the lock assembly;

wherein the plate includes at least one opening disposed therein and configured to receive at least a portion of the lock lever of the lock assembly; and wherein the at least one opening of the plate includes a stop surface configured to limit movement of the lock lever when the lock assembly is in the locked condition which provides the additional security feature to the lock lever when the lock assembly is in the locked condition.

2. The security tether of claim 1, further comprising a fastener configured to secure the plate to the latch assembly.

3. The security tether of claim 2, wherein the plate is configured to be fastened to the latch assembly.

4. The security tether of claim 1, wherein the stop surface is extended through the plate.

5. The security tether of claim 1, wherein the at least one opening in the plate extends through the plate.

6. The security tether of claim 1, wherein the plate further includes a second opening sized to receive a fastener.

7. The security tether of claim 1, wherein the stop surface extends along a portion of a periphery of the at least one opening.

8. A security tether for a latch assembly of a truck cap, which covers a rear bed of a pickup truck, wherein the latch assembly includes a pawl that is movable between a latched condition and an unlatched condition, a lock assembly with a lock lever that is engageable with the pawl when the lock assembly is in a locked condition and disengageable from the pawl when the lock assembly is in an unlocked condition, wherein the security tether is configured to provide an additional security feature to the lock lever, the security tether comprising:

a plate configured to be non-movable with respect to the lock assembly;

wherein the plate includes at least one opening disposed therein configured to receive at least a portion of the lock lever of the lock assembly; and wherein the at least one opening of the plate includes a stop surface which is engageable with the lock lever to provide the additional security feature to the lock assembly when in the locked condition.

9. The security tether of claim 8, further comprising a fastener configured to secure the plate to a latch assembly.

10. The security tether of claim 9, wherein the plate is configured to be fastened to the latch assembly.

11. The security tether of claim 8, wherein the stop surface is extended through the plate.

12. The security tether of claim 8, wherein the at least one opening in the plate extends through the plate.

13. The security tether of claim 8, wherein the plate further includes a second opening sized to receive a fastener.

14. The security tether of claim 8, wherein the stop surface extends along a portion of a periphery of the at least one opening.

15. A security tether for a latch assembly of a truck cap, which covers a rear bed of a pickup truck, wherein the latch assembly includes a pawl that is movable between a latched condition and an unlatched condition, a lock assembly with a lock lever that is engageable with the pawl when the lock assembly is in a locked condition and disengageable from the pawl when the lock assembly is in an unlocked condition, wherein the security tether is configured to provide an additional security feature to the lock lever, the security tether comprising:

a plate configured to be attached to the latch assembly adjacent the lock assembly;

wherein the plate is configured to be non-movable with respect to the lock assembly;

wherein the plate includes at least one opening disposed therein configured to receive at least a portion of the lock lever of the lock assembly;

wherein the at least one opening extends through the plate;

wherein the at least one opening also extends outwardly from the plate;

wherein the at least one opening has a periphery;

wherein the periphery of the at least one opening of the plate terminates where the at least one opening extends outwardly from the plate; and wherein the periphery of the at least one opening of the plate includes a stop surface configured to limit movement of the lock lever condition which provides the additional security feature to the lock lever when the lock assembly is in the locked condition.

16. The security tether of claim 15, further comprising a fastener configured to secure the plate to the latch assembly.

17. The security tether of claim 16, wherein the plate is configured to be fastened to the latch assembly.

18. The security tether of claim 15, wherein the stop surface is extended through the plate.

* * * * *